United States Patent [19]

Bakshi et al.

[11] Patent Number: 5,342,636
[45] Date of Patent: Aug. 30, 1994

[54] PROCESS FOR MODIFYING A FIBROUS BULKING AGENT

[76] Inventors: Amarjit S. Bakshi, 5520 De La Croix Way, Yorba Linda, Calif. 92687; Lakho L. Khatri, 709 Deer Skin Lane, Walnut, Calif. 91789

[21] Appl. No.: 878,769

[22] Filed: May 5, 1992

[51] Int. Cl.$^5$ .................. A23P 1/-08; A23L 1/48
[52] U.S. Cl. ................. 426/302; 426/482; 426/89
[58] Field of Search ............. 426/804, 302, 309, 93, 426/482, 89, 590, 633

[56] References Cited

U.S. PATENT DOCUMENTS

| | | |
|---|---|---|
| 3,573,058 | 3/1971 | Tiemstra . |
| 4,017,642 | 4/1977 | Orth, Jr. et al. . |
| 4,143,163 | 3/1979 | Hutchison ............... 426/804 |
| 4,357,467 | 11/1982 | Sachetto et al. . |
| 4,401,682 | 8/1983 | Battista .................. 426/804 |
| 4,565,702 | 1/1986 | Morley ................... 426/302 |
| 4,659,388 | 4/1987 | Innami et al. . |
| 4,680,189 | 7/1987 | Schumacher ............ 426/804 |
| 4,747,881 | 5/1988 | Shaw et al. . |
| 4,766,004 | 8/1988 | Moskowitz .............. 426/804 |
| 4,814,195 | 3/1989 | Yokoyama et al. ....... 426/804 |
| 4,834,990 | 5/1989 | Amer ..................... 426/804 |
| 4,900,573 | 2/1990 | Meyers ................... 426/302 |
| 4,927,649 | 5/1990 | Antenucci ............... 426/93 |
| 5,019,406 | 5/1991 | Ang ....................... 426/302 |
| 5,024,996 | 6/1991 | Ringe ..................... 426/804 |
| 5,126,150 | 6/1992 | Piatt ...................... 426/804 |
| 5,126,152 | 6/1992 | Feeney ................... 426/302 |
| 5,151,283 | 9/1992 | Foehse ................... 426/302 |
| 5,234,704 | 8/1993 | Devine ................... 426/590 |

*Primary Examiner*—Carolyn Paden
*Attorney, Agent, or Firm*—Pretty, Schroeder, Brueggemann & Clark

[57] ABSTRACT

A process for reducing the oil binding capacity of a solid fibrous bulking agent is described in which a modified bulking agent is produced for use in making reduced calorie food products. The bulking agent is combined with an additive (e.g. sugar, protein or combination thereof) in water to form a mixture. The mixture is agitated to form a slurry thereby coating the bulking agent with the additive, and the slurry is dried. The resulting bulking agent has a reduced oil binding capacity so that the bulking agent may be used on food products containing natural oils or fats to reduce the calories per unit weight without adversely affecting the texture of the food product.

8 Claims, No Drawings

PROCESS FOR MODIFYING A FIBROUS BULKING AGENT

BACKGROUND OF THE INVENTION

This invention relates generally to processes for reducing the oil binding capacity of fibrous bulking agents thus allowing for the use of the bulking agent to reduce the calorie content of oil based food products.

Reduced calorie food products are generally prepared by the addition of non-calorie or low calorie bulking agents to the food to decrease the amount of calories per unit weight. Other substances are also added so that the texture of the original product is maintained.

One of the most common methods for effectively decreasing the amount of calories per unit weight in a food product is the addition of water as a non-calorie ingredient, together with a thickener or emulsifier, to duplicate the texture of the original product. This method works well for water based food products, however, the addition of water tends to adversely affect the flavor, color, texture, and mouthfeel of oil or fat based food products. In addition, oil or fat based food products containing small quantities of water are generally microbiologically stable at room temperature, whereas food products containing significant quantities of water generally must be refrigerated after opening, or contain preservatives, to retard spoilage.

Many other methods of reducing calories in water based food products are known. However, such methods also are generally unacceptable for fat based or oil based food products.

The fat or oil content in food products contributes a large percentage of the calories. Thus, the removal of fat or oil is one method of reducing the calorie content of such food products. However, the removal of fat or oil results in a stiffer, more adhesive product and, therefore, only a limited reduction in calories of fat or oil based products can be obtained in this manner without significantly affecting the texture of the food product. Furthermore, after removal of fat or oil, the product generally requires extensive additional processing.

An alternative approach that has been tried to reduce the amount of calories in oil or fat based food products, includes the use of commercially available cellulose or other fibrous material as a non-calorie bulking agent. One example of such a product is AVICEL® microcrystalline cellulose. Such commercially available cellulose materials are capable of absorbing considerable quantities of oil, generally on the order of more than 1.5 grams of oil per gram of cellulose. This absorption thus removes the oil from contributing to the texture of the food product, yet the oil remains in the product contributing calories and fat. Because the usual desired texture (i.e., smoothness, consistency, and mouthfeel) of oil based food products depends in part upon the presence of substantial amounts of oil, the quantities of oil-binding materials that can be used, such as commercially available cellulose materials, are severely restricted. Consequently, only a limited reduction in calories can be obtained in this manner.

Another method of reducing the calorie content of peanut butter, a food product having a substantial oil content, is disclosed in U.S. Pat. No. 4,814,195. This method includes the use of modified polydextrose as a bulking agent. However, special authorization must be obtained from the Food and Drug Administration for each food product in which the use of polydextrose is contemplated. Consequently, the reduction in calories that can be obtained in this manner is accompanied by the time delay and cost of obtaining FDA approval.

Thus, it can be seen that attempts to reduce economically the calorie content of oil based food products without substantially altering the flavor and texture of the food product have met with limited success. Accordingly, there has existed a definite need for a process for modifying bulking agents so that they do not substantially affect the textural and flavor attributes of oil based food products while allowing for a reduction in calorie content of such products.

SUMMARY OF THE INVENTION

The present invention provides a process for reducing the oil binding capacity of a solid bulking agent used in making reduced calorie food products having natural oils or fats. The process includes the steps of combining a bulking agent and a water soluble additive in water and agitating this combination to form a slurry such that the bulking agent is coated with the additive, and then drying the slurry. The resulting product has a reduced oil binding capacity and a negligible calorie content, and does not deleteriously affect the texture and flavor characteristics of the food product in which it is used.

The additive used in the process may be any water soluble sugar, water soluble protein, combination of sugars, combination of proteins, or combination of sugars and proteins. Salt may also be used in addition to protein or combination of sugar and protein. Preferred sugars include sucrose, dextrose, and other water soluble sugars. The sugars may constitute from 0% to about 50% of the final product and, preferably, from about 5% to about 25%.

Preferred proteins suitable for use in the process of the present invention include soy protein, gelatin, egg protein, albumen and any other water soluble protein. The protein may constitute from 0% to about 50% of the final product and, preferably, from about 15% to about 40%.

Bulking agents are substances having negligible calorie content, bland or mild flavor, and moderate density which, when added to foods, increase the volume of food product. Preferred bulking agents are fibers such as soy fiber, oat fiber, rice bran, various cellulose products, and, most preferably the microcrystalline cellulose product sold by FMC designated FD100. FD100 is a cellulose gel consisting essentially of small (avg. 15 microns) particles of microcrystalline cellulose which are small enough to primarily consist of individual strands of fiber and thus have a reduced oil binding capacity. Therefore, modification of this cellulose gel in accordance with the process of the present invention results in a bulking agent having a very low overall oil binding capacity. Modification of other fibers in accordance with the process of the present invention results in a reduction of oil binding capacity by about 10%–75% from that of the unmodified fiber. The fiber constitutes at least about 50% of the modified bulking agent and preferably from about 55% to about 85%.

The modified bulking agent is useful in oil based food products by allowing for a reduction in fat or oil and therefore a reduction in calorie content by up to about 50%.

Other features and advantages of the present invention will become apparent from the following detailed description which illustrates, by way of example, the principles of the invention.

DESCRIPTION OF THE INVENTION

Bulking agents modified in accordance with the process of the present invention comprise a fibrous material coated with an additive resulting in a bulking agent having reduced oil binding capacity, a particle size of less than about 50 microns, less than about 3 calories per gram, and a bulk density between from about 0.2 to about 2.0 grams/cm$^3$. These bulking agents may be used in oil based food products allowing for reduction in calories of the food product without a significant effect on its flavor or textural properties. Preferably the bulking agents are either tasteless or have a relatively bland taste.

The theological properties of food products depend largely upon the ratio of the volume of liquid, i.e., oil, to the volume of solids. The addition of solid bulking agents to form reduced calorie food products changes this ratio and, hence, affects the theological properties of the resulting product. This influence on the theological properties of reduced calorie, oil-based food products becomes increasingly noticeable as the amount of the solid bulking agent is increased to achieve a greater reduction in calories. Thus, the physical properties of the solid bulking agents are important to realizing textural and flavor attributes in reduced calorie food products that substantially correspond to those in their full calorie counterparts. Foremost among these properties are particle size, oil-binding capacity, and density. In addition, the solid bulking agent is preferably either tasteless or has a relatively bland taste, and it should contribute only an insignificant number of calories to the reduced calorie food product, preferably less than about 3 calories per gram, and most preferably from 0 to about 1 calorie per gram.

Oat fiber, rice bran, and other natural fibers are often used as bulking agents. These fibers vary in size, texture and flavor, but generally all have from 0 to about 2 calories/gram. Cellulose products are also commonly used bulking agents. Cellulose products have a negligible to zero calorie content per gram and are generally preferred as bulking agents. Conventional cellulose bulking agents that are commercially available include cellulose, alpha cellulose, micro-fibrillated cellulose, natural fibers, and Avicel ® micro-crystalline cellulose.

These fibers and cellulose products have large porous surface areas and thus absorb large quantities of oil. This absorption of oil contained in the food product increases the viscosity, stiffness, and adhesiveness of the food product, and thus makes appreciable quantities of fibrous bulking agents unsuitable for use in food products having significant quantities of oil. Furthermore, the average particle size of many of these products is greater than about 25 microns which contributes to a gritty mouthfeel of the resulting food product. Particle sizes less than about 25 microns are generally not detectable by the human tongue unless present in large quantities. Thus, to avoid a gritty mouthfeel it is desirable to have the majority of particle sizes less than about 30 microns. However, smaller particles have a large surface area per unit volume, resulting in increased viscosity of the product in which these are used. This increase in viscosity results in increased processing cost. Therefore, it is desirable to have particles larger than about 5 microns. Preferably, the fiber particles are between about 5 and 50 microns with an average particle size of about 15 to about 20 microns.

When modifying bulking agents having an average particle size greater than about 30 microns, the fiber particles preferably are first reduced in size to an average particle size of from about 15 to about 25 microns with substantially all particles smaller than about 50 microns.

This may be accomplished by grinding the fibers in an air classifier mill or other machine capable of breaking fibers into small particles.

A cellulose gel comprising particles of micro-crystalline cellulose has been introduced by FMC Corp. The cellulose particles are small enough to be primarily individual strands of fiber rather than the honeycomb-like mesh of other commercial cellulose products. These particles are generally no larger than about 15 microns. This product also has a generally smoother surface area. Thus the oil binding capacity is less than that of other commercial cellulose products. This product is designated FD-100 by the manufacturer. The modification of FD--100 in accordance with the process of the present invention results in a modified bulking agent having an even lower oil binding capacity. Also, the small particle sizes do not significantly affect the mouthfeel of the food product in which the modified bulking agent is used, and they do not require an initial particle reduction step prior to processing.

The oil binding capacity of cellulose gel, as well as that of other commercially available, fibrous bulking agents, is reduced in accordance with the process of the present invention. "Oil binding capacity" as used herein refers to the amount of oil held by a unit weight of dry bulking agent, wherein the bulking agent has been prepared by mixing the bulking agent with an excess of oil and then removing the unbound oil by centrifugation. The oil binding capacity of unmodified fibrous bulking agents varies and depends on factors such as density, surface area, and particle size.

The oil binding capacity of commercially available fibrous bulking agents is reduced by processing the bulking agent with a water soluble additive. The bulking agent becomes coated with the additive, and many of the recesses on the fiber are filled in. Thus, the modified bulking agent has a reduced effective surface area with which to bind oil.

The additive is a water soluble sugar or water soluble protein or combination thereof. The additive is processed with the bulking agent to form a coating over a substantial portion of the surface of the bulking agent. The additive, being water soluble, remains on the surface of the bulking agent when used in an oil based food product having minimal water content. Thus the oil binding capacity of the fiber is reduced.

Water soluable sugars are suitable for use in the additive used in the process of the present invention. Representative sugars include monosaccharides, disaccharides and dextrines such as sucrose, dextrose, glucose, fructose, maltodextrine, polydextrose and any other water soluble sugars. Also, two or more sugars may be used in combination, with or without proteins. The sugars impart a slightly sweet taste to the bulking agent and the food products in which it is used. However, the sweetness is preferably moderate enough so as not to significantly affect the flavor of the final food product. The sugars also dissolve rapidly in the mouth. This stimulates saliva production, thus enabling the bulking agent to be easily swallowed without a perceptible gritty mouthfeel. Sugar may constitute from 0 to 100% of the additive and, preferably, is from about 15% to about 50%. Keeping the sugar content of the additive at less than about 50% avoids adding unnecessary calories or excessive sweeteness to the bulking agent or to the food product in which the bulking agent is used.

Water soluable proteins are also suitable for use in the additive used in the process of the present invention. Preferably, the proteins are bland in flavor or virtually tasteless so as not to significantly affect the flavor of the food product in which the modified bulking agent is used. Alternatively, the proteins could be selected to blend with or complement the flavors of the final food product in which the bulking agent is to be used. Representative proteins suitable for use include soy protein, gelatin, albumen (egg protein), lactalbumin (milk protein), and any other water soluble proteins or combination of proteins. The proteins also tend to have emulsifying properties and thus aid in emulsifying the food product in which the modified bulking agent is used. The proteins also tend to dissolve more slowly in the mouth thus remaining as a coating on the bulking agent and reducing the gritty mouthfeel of the bare fiber. Protein may constitute from 0 to 100% of the additive and preferably is from about 50% to about 85%. Two or more proteins may be used in combination in the additive either with or without the addition of sugar.

The amount of additive may range from about 5% to about 50% by weight of the modified bulking agent prepared by the process of the present invention and will result in producing a modified bulking agent having a reduced oil binding capacity. Preferably, the additive constitutes from about 15% to about 45%. More than a total of 50% of the additive results in a modified bulking agent having an excess of additive not bound to the fiber. This increases the calorie content of the modified bulking agent without a corresponding reduction in oil binding capacity. Less than about 5% additive does not decrease the oil binding capacity of the fiber sufficiently to allow effective use in oil based food products.

The ratio of the protein to the sugar in the additive may range from 0:1 to 1:0 depending in part on the desired characteristics of the final bulking agent. The ratio and the particular ingredients used in the additive are also influenced by the food product in which the modified bulking agent is to be used. Preferably the ratio is from about 1:1 to about 3:1. The modified bulking agent resulting from the process of the present invention thus has an overall calorie content of less than about 3 calories per gram and a reduced oil binding capacity such that the bulking agent only absorbs from about 50% to about 75% of its weight of oil.

The additive, the bulking agent, and water are combined using sufficient water to completely wet the bulking agent. The amount of water necessary will depend on the particular bulking agent being used, but generally is at least four times by weight the amount of bulking agent. Preferably, the amount of water is at least five or six times the amount of bulking agent. In some cases, the amount of water may even be as high as ten times the amount of bulking agent or even higher. However, with a weight ratio of water to bulking agent greater than about 10:1 the inefficiency, increased time, and increased cost of removing the water from the modified bulking agent begin to outweigh the benefits of processing a less viscous solution. Alternatively, the additive and bulking agent may be mixed dry and then mixed with water. The additive is dissolved and the bulking agent is then coated with the additive.

The additive may be dissolved in the water forming a uniform solution to which the bulking agent is added. Thus, the bulking agent is easily coated with the additive in the solution.

The bulking agent, additive, and water are agitated to form a slurry. Any type of mixing equipment may be used that is capable of dispersing the bulking agent in an aqueous solution of additive. One type of agitation equipment that is satisfactory is a Hobart mixer used with a whipping blade. The slurry is agitated for an amount of time sufficient to disperse the bulking agent in the solution and thus coat the bulking agent with the additive that is dissolved in water. The length of time will vary with the type of equipment, the ratio of water to bulking agent, and other factors, but should usually be at least 10 minutes and preferably is about 20-40 minutes. Of course the agitation may be continued for much longer than 40 minutes, if desired. However, in most cases sufficient mixing and coating of the bulking agent will occur in the first 40 minutes, thus making further agitation costly and time consuming with few consequent benefits, if any, in the process or the product.

Preferably, the slurry is agitated at a moderately elevated temperature of from about 100° F. to about 200° F. The Hobart mixer may be equipped with a heating coil surrounding the mixing bowl to enable regulation of the temperature of the slurry within the bowl. Although the agitation may be performed at room temperature, the moderately elevated temperature facilitates processing.

The well agitated slurry is then dried to remove the water leaving the modified bulking agent. The slurry may be dried by any known means for removing water from a slurry of solids such as spray drying, drum drying, oven drying, vacuum drying, or other suitable drying techniques.

For example, a drum dryer has a rotatable drum which is heated from the inside and is made of a material that conducts the heat to the outside surface of the drum. The drum surface is heated to a temperature greater than 212° F. The slurry is poured onto the heated drum surface and after the water evaporates, the modified bulking agent is removed from the surface of the drum. The modified bulking agent may be ground to separate particles that may have stuck together in the drying process.

Another drying process is to transfer the slurry to trays and dry in an oven by heating to a temperature greater than 212° F. for sufficient time to evaporate the water. The modified bulking agent may then be ground or otherwise reduced to a particle size of about the same as the original fiber used in the process.

Yet another method of drying the slurry is to use a spray dryer. Niro Atomizer manufactures spray drying equipment which may be used in carrying out the process. In spray drying, the slurry is pumped through a fine nozzle with hot air, the slurry is thus atomized in the air and is sprayed into a container of hot air. The water is evaporated off and the dried particles fall to the bottom of the container. The nozzle size may be small enough to produce particles that do not require further grinding. If a larger nozzle is used, some grinding may be desired to reduce the particle size to an average of less than 25 microns.

The modified bulking agent produced by the described process has an oil binding capacity of about 50% to about 75% of its weight. The unmodified bulking agents generally have oil binding capacities of above 100%. Thus the modified bulking agent may be used in oil based food products without absorbing substantially all of the oil and deleteriously affecting the texture of the food product.

Oil based food products containing a bulking agent having a reduced oil binding capacity in accordance with the process of the present invention, contain fewer calories per unit weight than does the same food product without the bulking agent. The texture and mouthfeel of oil based food products depends largely upon the free oil content of the food product. Thus, bulking agents having a reduced oil binding capacity do not bind all of the free oil in the food product leaving the texture and other organoleptic properties substantially unaffected.

The modified bulking agent has a reduced oil binding capacity due to being coated with a water soluble additive. Thus, to avoid separation of the additive from the fiber, the food product must be substantially water free. While virtually every food product contains some water, it is necessary to minimize the water content of food products in which the modified bulking agent is to be used to avoid water dissolving the additive and, thus, undesirably increasing the oil binding capacity of the bulking agent. The water content of the food product containing the modified bulking agent should be less than 5% and preferably less than about 2%.

The reduced calorie food product usually will contain about 5% to about 50% by weight of a bulking agent having a reduced oil binding capacity. The actual calorie reduction depends on the type of food product, as well as the calorie content, density, and oil binding capacity of the modified bulking agent, and the amount of bulking agent used, but will generally range from about 10% to about 50%.

The examples that follow provide a more detailed description of the present invention. These examples are, however, merely illustrative and are not intended as a limitation of the scope of the invention.

EXAMPLE 1

Process for reducing the oil binding capacity of cellulose.

80 g cellulose
28 g soy protein
16 g sucrose
450 g water

The dry ingredients are mixed in a Hobart mixer. The water is then added to form a mixture having the consistency of a thin paste. The mixture is maintained at a temperature of 110° F., mixed for 30 minutes at medium speed using a whipping blade to form a slurry. The slurry is then spread on a tray and thoroughly dried in an oven at about 217° F. The dried product is then ground to an average particle size of 15 microns with substantially all particles ranging from about 5 to 50 microns.

The product is a modified bulking agent having a reduced oil binding capacity for use in oil based food products.

EXAMPLE 2

Process for reducing the oil binding capacity of microcrystalline cellulose.

64.5 g microcrystalline cellulose gel
35.5 g soy protein
400.0 g water

The additive, consisting of soy protein, is dissolved in the water and mixed in a Hobart mixer for 15 minutes to form a solution. The microcrystalline cellulose gel is added to the solution and the mixture is mixed for an additional 15 minutes to form a slurry. The water is kept at 110° F. by a steam tube surrounding the mixing bowl. The slurry is transferred to a tray and is thoroughly dried in an oven at 240° F. The resulting bulking agent is then ground to an average particle size of 15 microns.

The use of this modified bulking agent in an oil based food product, such as the reduced calorie peanut butter product of Yokoyama, U.S. Pat. No. 4,814,195, results in a food product having a mouthfeel significantly improved over the mouthfeel of a food product using unmodified cellulose.

EXAMPLE 3

Process for reducing the oil binding capacity of cellulose.

65.0 g cellulose
35.0 g sugar
400.0 g water

The process for combining these ingredients is essentially the same as that described in Example 2 wherein the additive consists of 100% sugar.

Use of this modified cellulose in an oil based food product results in a reduced calorie food product having a significantly improved mouthfeel.

EXAMPLE 4

Process of reducing the oil binding capacity of cellulose.

80 g cellulose
32 g soy protein
24 g maltodextrine
24 g sugar
500 g water

The process for combining these ingredients is essentially the same as that described in Example 2 wherein the additive consists of a combination of soy protein, maltodextrine, and sugar.

EXAMPLE 5

Reduced calorie food product containing a modified bulking agent having reduced oil binding capacity.

52.9 g peanut paste
29.85 g modified cellulose of Example 2
6.0 g sugar
0.75 g stabilizer
4.0 g peanut oil
1.5 g salt The peanut paste is heated to 150° F. and transferred to a Hobart mixer. The mixer is maintained at a temperature of from about 130° F. to about 150° F. The modified bulking agent is added slowly while mixing at medium speed and mixing is continued for 15 minutes. The remaining ingredients are then added, and mixing at medium speed is continued for an additional 30 minutes.

Those skilled in the art are able to adjust the mixing and filling conditions in formulations to obtain the desired consistency of commercial peanut butters.

The peanut butter product described in Example had a 25% reduction in calories from the full calorie counterpart and also had an improved mouthfeel as compared to the peanut butter product prepared with unmodified cellulose.

EXAMPLE 6

Reduced calorie peanut butter food product containing a modified bulking agent having reduced oil binding capacity.

60.25 g peanut paste
28.5 g modified cellulose of Example 3
7.0 g soy protein
0.75 g stabilizer
2.0 g peanut oil
1.5 g salt The process for combining these ingredients is essentially the same as that described in Example 5. The peanut butter product described in Example 6 had a 25% reduction in calories compared to the full calorie counterpart peanut butter product. The peanut butter product of Example 6 also had an improved mouthfeel compared to a peanut butter product prepared with unmodified cellulose bulking agent.

EXAMPLE 7

Reduced calorie peanut butter food product containing a modified bulking agent having reduced oil binding capacity.

55.75 g peanut paste
40.0 g modified cellulose of Example 4
0.75 g stabilizer
2.0 g peanut oil
1.5 g salt The process for combining these ingredients is essentially the same as that described in Example 5. The peanut butter product described in Example 7 had a 33% reduction in calories compared to the full calorie counterpart peanut butter product. The peanut butter product of Example 6 also had an improved mouthfeel compared to a peanut butter product prepared with unmodified cellulose bulking agent.

EXAMPLE 8

Reduced calorie chocolate food product containing a modified bulking agent having reduced oil binding capacity.

9 lbs. sugar
2 qt. milk
1 lb. butter
4 lb. modified cellulose
2 lb. chocolate

The sugar, milk, and butter are thoroughly mixed and brought to a boil. The modified cellulose and chocolate are then added. The mixture is stirred continuously while boiling until thick. Those skilled in the art are able to determine times and mixing conditions to achieve consistency for preparation of commercial milk chocolates. A few drops of vanilla are added to the thickened mixture, and it is poured into a tray. When cool, the chocolate is cut into small pieces. The milk chocolate product of Example 8 has a 25% reduction in calories compared to full calorie milk chocolate and has a mouthfeel improved over that of a milk chocolate product prepared with unmodified cellulose.

While the preferred embodiment and applications of this invention have been shown and described, it would be apparent to those skilled in the art that many more modifications are possible without departing from the inventive concept herein described. The invention, therefore, is limited only by the lawful scope of the claims which follow.

We claim:

1. A process for reducing the oil binding capacity of a solid fibrous bulking agent, comprising the steps of:
   combining the bulking agent and an additive consisting essentially of at least one water soluble sugar and at least one water soluble protein in water to form a mixture;
   agitating the mixture to form a slurry, whereby the bulking agent is coated with the additive;
   drying the slurry to yield a modified bulking agent having a reduced oil binding capacity.

2. A process as in claim 1 wherein the bulking agent consists essentially of particles of less than 50 microns in size.

3. A process as in claim 1 wherein the sugar and the protein are in a ratio by weight of from about 2:1 to about 1:2.

4. A process as in claim 1 wherein the additive is first dissolved in the water to form a solution and the bulking agent is added to the solution to form the mixture.

5. A process as in claim 1 wherein the bulking agent and the additive are in a ratio by weight of from about 1:1 to about 3:1.

6. A process as in claim 1 wherein the bulking agent and the water are in a ratio by weight of from about 1:5 to about 1:8.

7. A process as in claim 1 wherein the modified bulking agent has less than about 3 calories per gram.

8. A modified fibrous bulking agent having a reduced oil binding capacity prepared in accordance with the process of claim 1.

* * * * *